United States Patent
Bolton

(10) Patent No.: US 7,482,801 B2
(45) Date of Patent: Jan. 27, 2009

(54) DEVICE TO MECHANICALLY SECURE A MAGNETIC LINEAR POSITION SENSOR

(75) Inventor: Edward Alexander Bolton, Brindas (FR)

(73) Assignee: Electricfil Automotive, Miribel Cedex (FR)

( * ) Notice: Subject to any disclaimer, the term of this patent is extended or adjusted under 35 U.S.C. 154(b) by 0 days.

(21) Appl. No.: 11/656,963

(22) Filed: Jan. 24, 2007

(65) Prior Publication Data

US 2007/0205760 A1 Sep. 6, 2007

Related U.S. Application Data

(60) Provisional application No. 60/774,664, filed on Feb. 21, 2006.

(30) Foreign Application Priority Data

Jan. 26, 2006 (FR) .................................. 06 00706

(51) Int. Cl.
*G01B 7/14* (2006.01)
*G01B 7/30* (2006.01)
(52) U.S. Cl. .............................. 324/207.24; 324/207.25
(58) Field of Classification Search ........................ 324/207.24–207.26; 73/514.31, 514.39, 1.75, 73/1.79, 162
See application file for complete search history.

(56) References Cited

U.S. PATENT DOCUMENTS

| 4,909,560 | A | 3/1990 | Ginn |
| 6,546,780 | B1 | 4/2003 | Palfenier et al. |
| 2003/0074999 | A1 | 4/2003 | Shioji et al. |

FOREIGN PATENT DOCUMENTS

| CH | 82270 | 2/1920 |
| EP | 0 287 506 | 10/1988 |
| EP | 0 644 397 | 3/1995 |
| EP | 1 450 136 | 8/2004 |
| GB | 2 332 250 | 6/1999 |
| WO | 92/17719 | 10/1992 |

*Primary Examiner*—Bot LeDynh
(74) *Attorney, Agent, or Firm*—Clark & Brody

(57) ABSTRACT

The invention concerns a device to mechanically secure in position a magnetic linear position sensor that includes a support (4) equipped with detection cells that are sensitive to magnetic induction and a target slide (5) fitted with magnetic elements and mounted to slide on the support in relation to the detection cells.

According to the invention, the device includes:
mechanical locking resources (12) between the target slide and the support, in order to place the target slide in a reference position in relation to the support,
and resources (13) for controlling the locking resources so that the latter can pass from a locked position to an unlocked position of the target slide (5) in relation to the support (4), and vice versa.

17 Claims, 5 Drawing Sheets

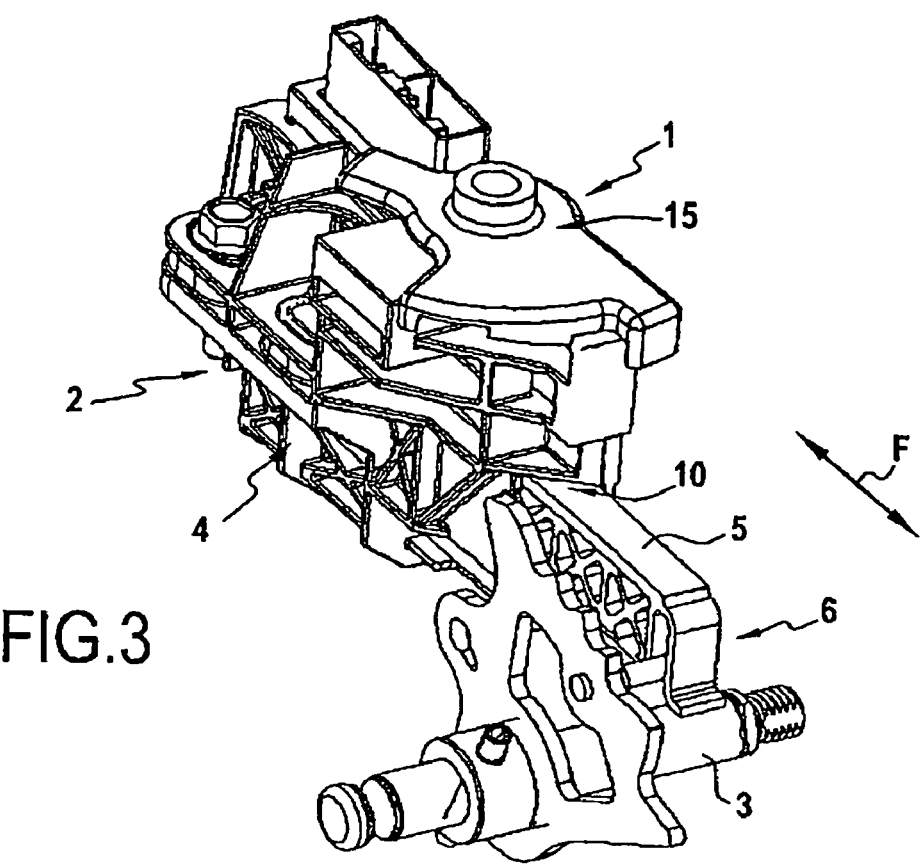
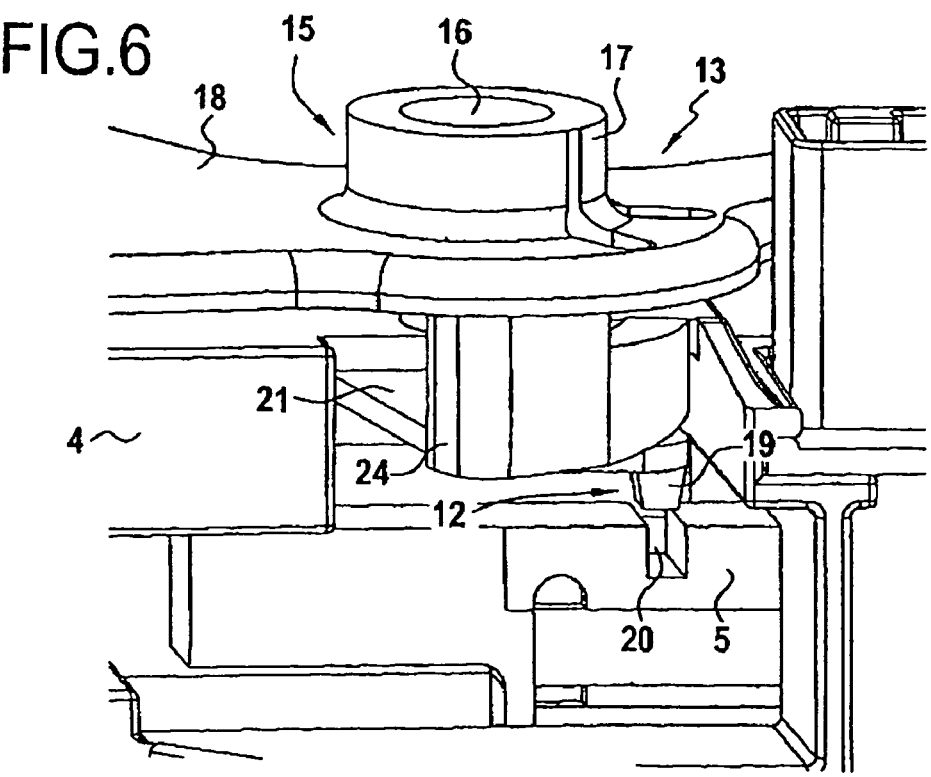

DEVICE TO MECHANICALLY SECURE A MAGNETIC LINEAR POSITION SENSOR

This application claims the benefit of U.S. Provisional Application No. 60/774,664, filed Feb. 21, 2006, the content of which is incorporated herein by reference. In addition, the present application claims foreign priority based on French Patent Application No. 0600706, filed Jan. 26, 2006, the content of which is incorporated herein by reference.

The subject of the invention concerns the technical area of magnetic sensors, designed to detect different linear positions adopted by a moving part, in the general sense.

The subject of the invention finds a particularly advantageous application in the motor vehicle area, where it can be fitted to an automatic gearbox, in order to detect the speed selected by an operator.

In the preferred technical area of the invention, selection of the different positions of an automatic gearbox is achieved by means of a control lever, generally in rectilinear displacement by the operator. Such a lever can be used to select different positions, such as a stop position, reverse, neutral or various forward drive positions, for example.

In previous designs, the method involves detection of the different positions adopted by the speed selection lever. According to one known example of implementation, the control rod is connected, by means of a transmission link, to a mobile target forming part of a magnetic linear position sensor. This mobile target, which is manufactured in the form of a guided slide, is fitted with magnetic elements positioned on various parallel tracks between them. These tracks are located close to cells that are sensitive to magnetic induction. These magnetic elements are arranged so that the cells deliver a different combination of binary signals for each position adopted by the control rod, that is by the selection lever.

Such a sensor can be used to ascertain the different linear positions adopted by the selection lever of an automatic gearbox, from the different combinations of binary signals. This sensor has the advantage of operating without any relative mechanical friction between the mobile target and the sensitive cells. However, such a sensor has one major drawback, which is associated with fitting problems that affect its detection qualities.

The subject of the invention therefore aims to overcome the drawbacks of previous designs, by proposing a device that can be used to achieve correct and reliable fitting of a magnetic linear position sensor.

In order to attain such an objective, the subject of the invention proposes a device to mechanically secure in position a magnetic linear position sensor that includes a support equipped with detection cells that are sensitive to magnetic induction, and a target slide fitted with magnetic elements and mounted to slide on the support in relation to the detection cells. This device includes:
  mechanical locking resources between the target slide and the support, in order to place the target slide in a reference position in relation to the support,
  and resources to control the locking resources so that the latter can pass from a locked position to an unlocked position of the target slide in relation to the support, and vice versa.

According to one advantageous characteristic of the invention, the control resources include a lever that is mounted to rotate about a axle carried by the support, and designed to act upon the locking resources, so that, for two angular positions of the lever, respectively referred to as locked and unlocked, the locking resources occupy their locked and unlocked positions respectively.

According to one particular implementation example, the locking resources include an indexing finger, controlled so that in the locked position, it fits onto a slot created in the target slide, and to be removed from the said slot in the unlocked position.

For example, the indexing finger is carried by a tongue element extending as an extension from the support and upon which the rotating lever acts.

According to this implementation example, the rotating lever acts upon the tongue element by means of a ramp carried by the lever, so that the indexing finger is able to pass from the locked position to the unlocked position and vice versa.

Another aim of the invention is to propose a device that is designed to lock the sensor in order that the operation of fitting the sensor can be performed.

To this end, the lever includes a lock indicator arm which, in the locked position of the lever, extends as a projection in relation to the support in order to prevent the closure of a housing for accommodation of the sensor and which, in the unlocked position of the lever, is retracted in relation to this projected position, so as to enable the closure of the said housing.

Another aim of the invention is to propose a device that prevents the removal of the sensor in the unlocked position.

According to one characteristic of the invention, the device includes resources that prevent the rotation of the lever, in order to pass from the unlocked position to the locked position, whenever the target slide is not occupying its reference position determined by the locking resources.

Advantageously, the resources to prevent rotation include an end-stop carried by the lever and encountered by the indexing finger, so that in the unlocked position, the end-stop comes into contact with a support wall, thus preventing the rotation of the lever, and that in the locked position, an axial movement of the lever causes the end-stop to no longer fit onto the wall of the support, thus allowing the rotation of the lever.

According to one characteristic of the invention, the lever includes an anti-removal arm which, in the unlocked position, extends to coincide with the devices for securing the support in the accommodating housing, for the purpose of preventing the removal of the sensor and which, in the locked position, lies outside of the devices for securing the support to enable securing of the sensor in the accommodating housing.

According to one advantageous characteristic of the invention, the lever is mounted on the support by means of an anti-extraction system, thus allowing the engagement of the lever on its axle in one position of engagement which is located outside of the angular range determined by the locked and unlocked positions, where this anti-extraction system firstly includes additional retention resources fitted to the lever and the support and fitting together at least between the locked and unlocked positions, so as to prevent the axial withdrawal of the lever and, secondly, an end-stop surface presented by the lever, designed to come into contact with an obstacle mounted on the support, when the lever is located between its locked and unlocked positions, for the purpose of preventing the said lever from taking up its engaged position.

Advantageously, the obstacle with which the end-stop surface makes contact takes the form of a connector.

The purpose of the invention is to propose a magnetic linear position sensor that includes a device according to the invention in order to mechanically secure a target slide in position in relation to a support equipped with detection cells.

Preferably, the magnetic linear position sensor includes a target slide connected to a control rod in the gearbox of a motor vehicle.

Various other characteristics will emerge from the description that follows, with reference to the appended drawings which show, by way of a non-limiting example, forms of implementation of the subject of the invention.

FIG. 3 is a schematic view in perspective illustrating a device according to the invention associated with a magnetic linear position sensor.

FIGS. 6, 7 and 8 are views of a characteristic detail of the locking device according to the invention, in the locked and unlocked positions respectively.

Figure 1:
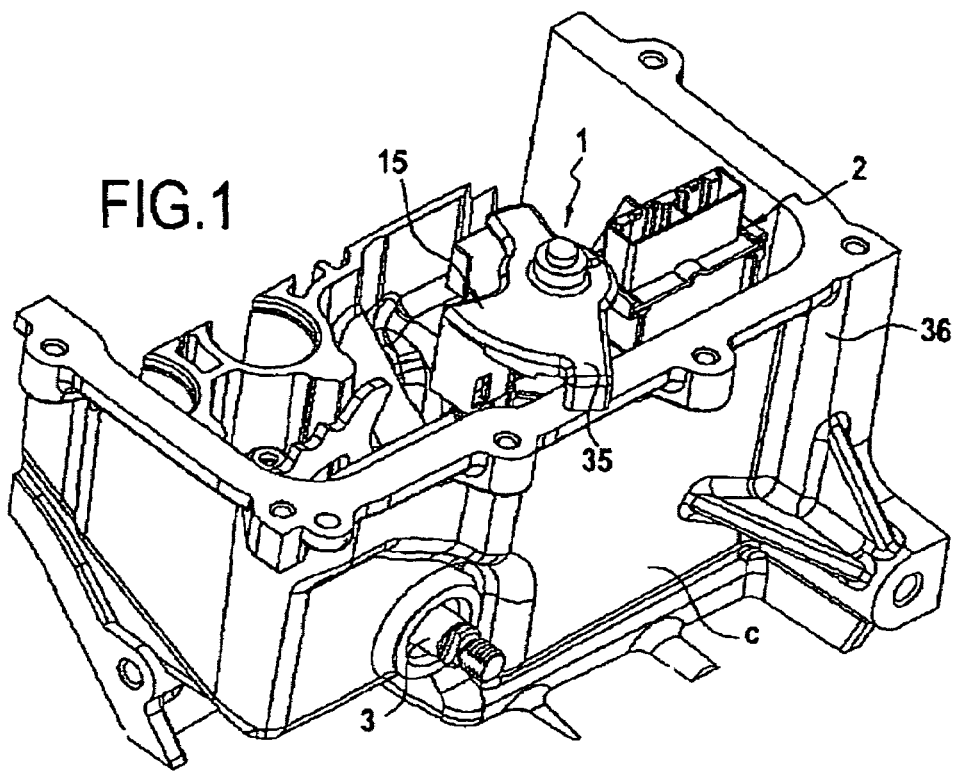
FIGS. 1 and 2 illustrate an example of the fitting of a sensor in a housing, in a locked and unlocked position respectively.
Figure 2:
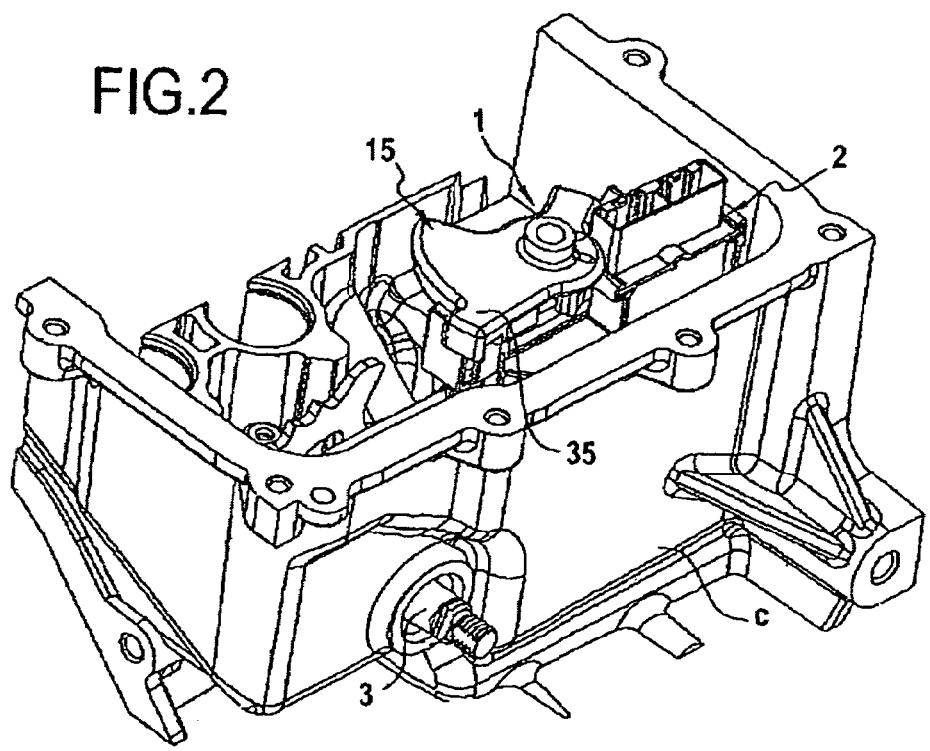

As can be seen more precisely in FIGS. 1 to 3, the invention concerns a device 1 designed to mechanically secure in position a magnetic linear position sensor 2. In a conventional manner, a magnetic sensor 2 is designed to detect the linear positions adopted by an axle or a control rod 3, preferably in the automatic gearbox of a motor vehicle. According to this implementation example, illustrated more particularly in FIGS. 1 and 2, the magnetic sensor 2 is intended to be mounted within a housing C that is capable of being closed by a lid not shown.

The magnetic sensor 2 includes a support 4 and a target slide 5 mounted to slide on the support 4. The movement of the target slide 5 is slaved to that of the axle 3 by means, for example, of a transmission link 6 of any type.

Figure 4:
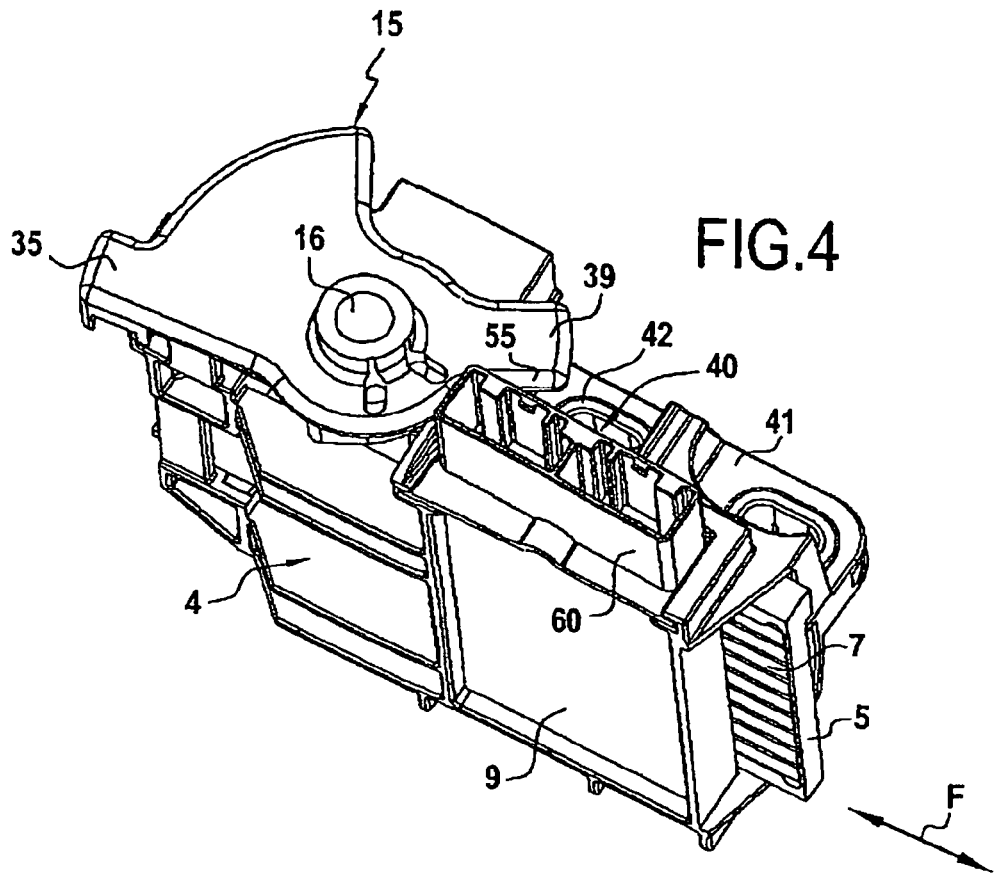
FIG. 4 is another view of the magnetic position sensor illustrated in FIG. 3.
Figure 5:
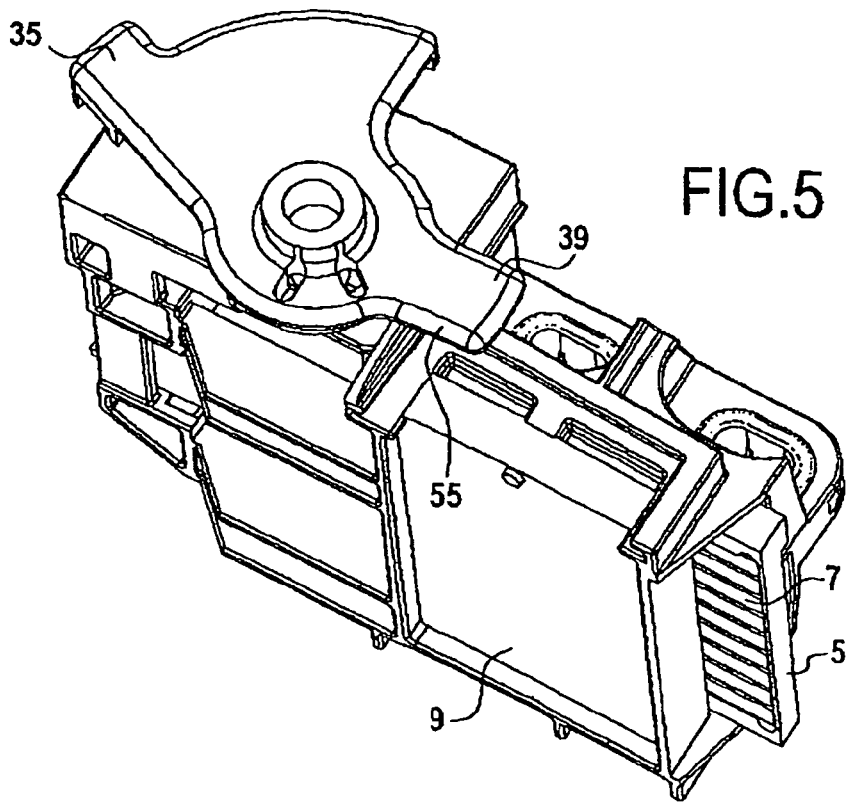
FIG. 5 is a view of the sensor, similar to FIG. 4, in which the connector has been withdrawn.

As can be seen precisely in FIGS. 4 and 5, the target slide 5 is equipped with magnetic elements positioned so as to constitute a series of magnetic tracks 7 so as to constitute a series of magnetic tracks 7 lying parallel to each other, in one direction parallel to the direction of linear movement of the target slide 5 as represented by the arrows F. The tracks 7 are intended to be moved in relation to detection cells that are sensitive to magnetic induction (not shown), but mounted, conventionally, on a printed circuit embedded into a resin block 9 carried by the support 4.

In a conventional manner, the cells deliver a binary signal as a function of the value of the magnetic induction applied. The arrangement of the cells and of the magnetic elements on the tracks are chosen so that the cells deliver different logical combinations for each of the corresponding different positions of the target slide 5 and therefore of the control lever. The arrangement of the cells in relation to the tracks 7 will not be described more precisely, since it does not form part of the subject of the invention, but does form part of the knowledge of professional engineers.

The support 4 includes guidance resources 10 of the slider type, to allow the movement of the target slide 5 on the support, in the direction of movement F, so that a magnetic gap of specified width is established between the mobile target slide 5 and the fixed detection cells.

Figure 7:
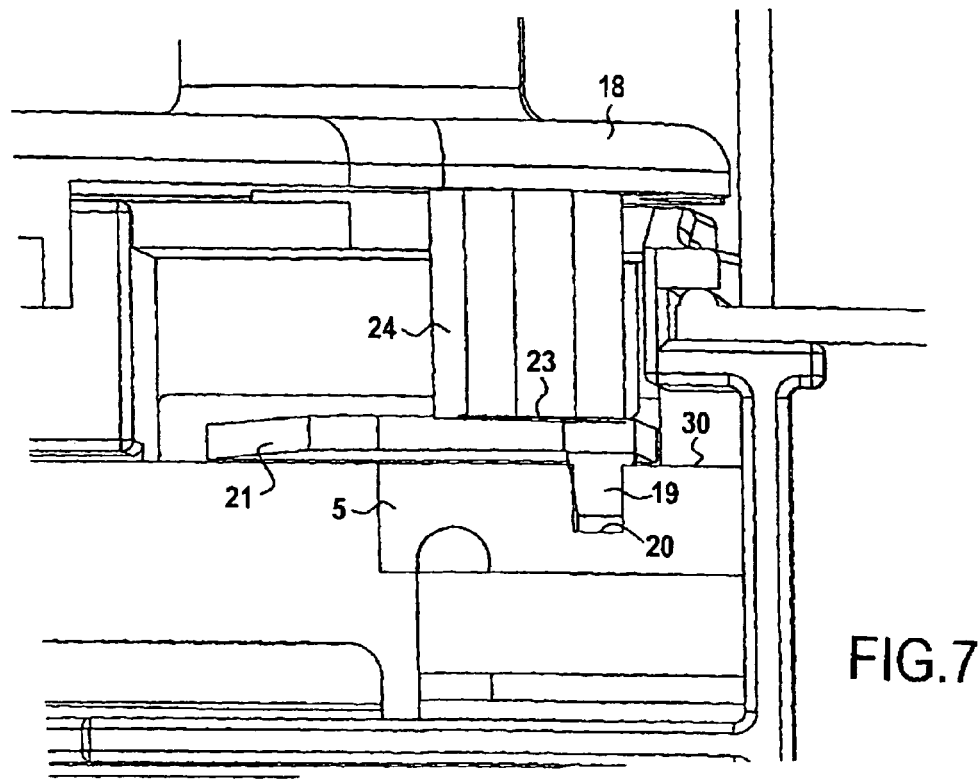
Figure 8:
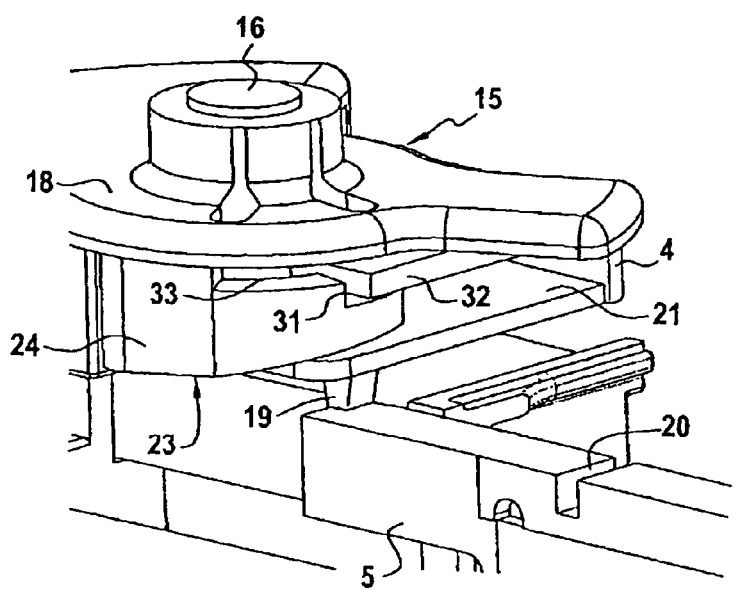

As can be seen precisely from FIGS. 6 to 8, the locking device 1 includes mechanical locking resources 12 between the target slide 5 and the support 4, in order to place the target slide 5 in a specified reference position in relation to the support 4. The locking device 1 also includes resources 13 for controlling the locking resources 12, so that the latter can pass from a locked position to an unlocked position of the target slide 5 in relation to the support 4 and vice versa.

It should be considered that these locking resources 12 allow the creation of a mechanical connection between the target slide 5 and the support 4, so that the target slide is temporarily attached to the support. These locking resources 12, when in the locked position, thus prevent the loss of the target slide 5, in particular during the operation of fitting the magnetic sensor 2. In a complementary way, these locking resources 12 can be used to place the target slide 5 in a reference position in relation to the support, corresponding to correct fitting of the target slide in relation to the support, that is in relation to the detection cells. According to one advantageous characteristic of implementation, these locking resources 12 can be operated only if the target slide 5 is placed in a reference position, that is in a correct fitting direction.

As can be seen precisely in FIGS. 6 to 8, the control resources 13 include a lever 15, mounted to rotate about a axle 16 carried by the support 4. The lever 15 has a tubular opening 17 for insertion of the axle 16, from which a plate 18 extends radially. The lever 15 is designed to act upon the locking resources 12, so that, for two angular positions of the lever, respectively referred to as locking, illustrated in FIG. 7, and unlocking, illustrated in FIGS. 6 and 8, the locking resources 12 occupy their locked and unlocked positions respectively.

As can be seen precisely from FIG. 6 to 8, the locking resources 12 include an indexing finger 19 which is controlled so that, in the locked position, it fits into a slot 20 created in the target slide 5 and to be removed from the said slot 20 in the unlocked position. In the locked position, the indexing finger 19 blocks the target slide 5, which can no longer slide.

In the implementation example illustrated, the indexing finger 19 is carried by a tongue element 21 extending from the support 4, and on which the rotating lever 15 acts. Advantageously, the rotating lever 15 acts upon the tongue element 21 by means of a ramp 23 carried by the lever 15. More precisely, the ramp 23 is arranged at the extremity of a skirt 24 extending to the lower part of the plate 18 on the lever 15. It should be understood that the ramp 23 is arranged on a circumference that is centred on the axis of rotation 16 of the lever 15, so that the indexing finger 19 is able to pass from a position engaged in the slot 20 in FIG. 7 to a position out of the slot 20 in FIG. 6 and vice versa, when the rotating lever passes from its locked position to its unlocked position by executing a given rotation angle. Advantageously, to move from an unlocked position to a locked position, the lever 15 must be turned and pushed, so that the lever also undergoes an axial movement, as will be explained in the remainder of the description.

It should be understood that the ramp 23 exerts a pressure on the tongue element 21, so as to bring the indexing finger 19 within the slot 20 if, of course, the latter is positioned opposite to the indexing finger 19, as illustrated in FIG. 6. Advantageously, the device 1 includes resources 30 that prevent the rotation of the lever 15 in order to pass from the unlocked position to the locked position, whenever the target slide 5 is not occupying its specified reference position, by positioning the slot 20 opposite to the indexing finger 19. The blocking resources 30 are composed of an end-stop 31 presented by the skirt 24 of the lever and intended to come into contact with a wall 32 of the support 4, when the target slide 5 is not occupying its reference position (FIG. 8). When the target slide 5 is not occupying its reference position, meaning that the slot 20 is not positioned opposite to the indexing finger 19, the latter is in contact with the target slide 5, preventing the axial descent of the lever and therefore of the end-stop 31 which comes into contact with the wall 32. The lever 15 thus cannot pass from the unlocked position to its locked position, to the extent that it is prevented from rotating by the end-stop 31.

When the target slide 5 is occupying its reference position (FIG. 6), the lever 15 can be moved axially and in rotation so as to cause the indexing finger 19 to be engaged in the slot 20. The axial movement of the lever 15 is enabled by the coincidence the indexing finger 19 with the slot 20, while the rotation of the lever 15 is allowed since the wall 32 is no longer on the trajectory of the end-stop 31. To this end, the skirt 24 is equipped with a slot 33 into which the wall 32 enters during the rotation of the lever, leading to the engagement of the indexing finger 19 in the housing 20. In the locked position, the end-stop 31 lies between the wall 32 and the tongue element 21.

According to another characteristic of the subject of the invention, the lever 15 includes a lock indicator arm 35 which, in the locked position of the lever (FIG. 1), extends as a projection in relation to the support 4 in order to prevent the closure of the housing C for accommodation of the sensor and which, in the unlocked position of the lever (FIG. 2), is retracted in relation to this projected position, so as to enable the closure of the said housing C.

In the example illustrated in FIG. 1, the target slide 5 is in the locked position (indexing finger 19 fitting into the slot 20), to the extent that the lock indicator arm 35 extends as a projection in relation to the support 4 so as to extend to the level of one of the walls 36 of the housing, thus preventing the closure of the housing, with a lid for example. The lock indicator 35 lies above at least one part of the adjacent wall 36 of the housing C, which thus prevents the closure of the housing C with a magnetic position sensor 1 in the locked position, that is in position of non-use. The rotation of the lever 15, in order to pass from its locked position (FIG. 1) to its unlocked position as illustrated in FIG. 2, results in the placement of the lock indicator arm 35 in a retracted position in relation to the wall 36 of the housing C, allowing its closure by means of a lid.

According to another characteristic of the invention, the lever 15 includes an anti-removal arm 39 which, in the unlocked position (FIG. 2, 4), coincides with devices 40 for securing the support 4 in the housing C, for the purpose of preventing the removal of the sensor 1. In the example illustrated, the support 4 is equipped with a plate 41 that is fitted with apertures 42 for passage of the securing devices 40, such as screws. In the unlocked position of the lever 15, the anti-removal arm 39 lies above at least one of these apertures 42 in order to prevent the removal of the securing devices 40. In the locked position of the target slide 5 in relation to the support 5 in FIG. 1, the anti-removal arm 39 lies outside of the screw apertures 42 in order to allow fixing of the sensor 1 within the housing C.

Figure 9:
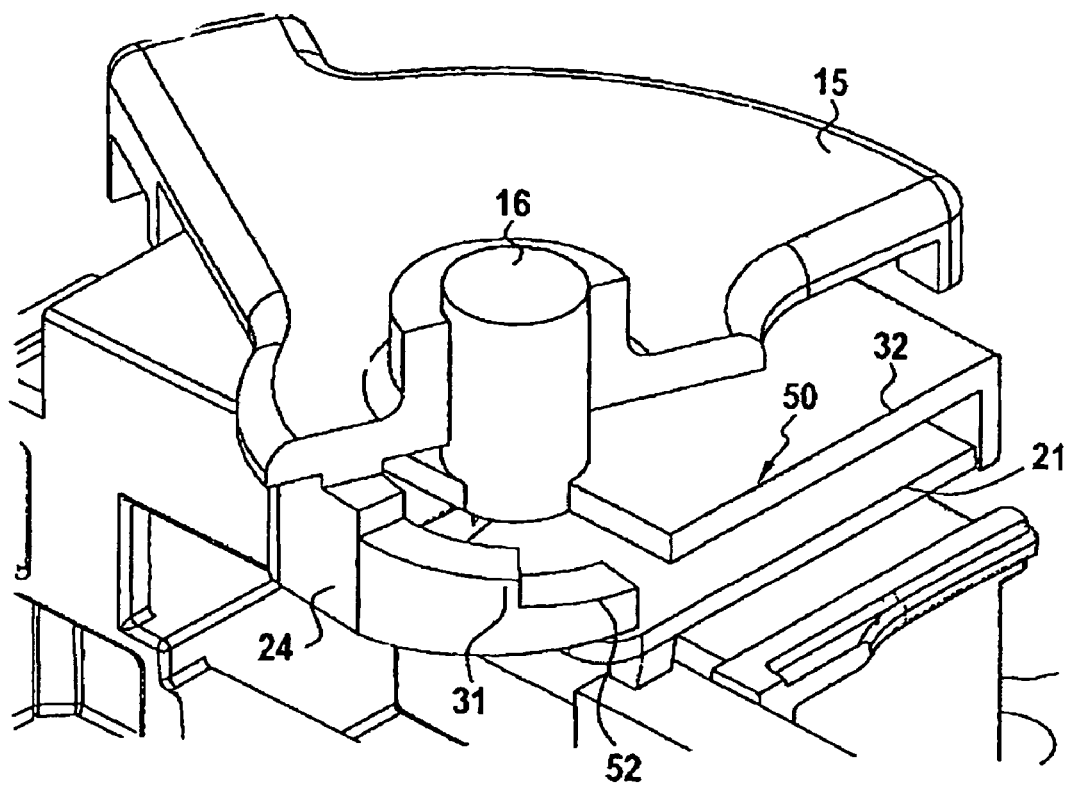
FIG. 9 is a view in perspective, with a part removed, showing a characteristic detail of the device according to the invention.

According to another characteristic of the invention, the lever 15 is mounted on the support 4 by means of an anti-extraction system 50, thus allowing the axial engagement of the lever on its axle 16, in one position of engagement which is located outside the angular range determined between the locked and unlocked positions. In the example illustrated in FIG. 9, the lever 15 is occupying its angular position of engagement on the axle 16. The anti-extraction system 50 firstly includes additional retention resources, fitted to the lever 15 and the support 4, so that they fit together at least between the locked and unlocked positions, so as to prevent the axial withdrawal of the lever. Preferably, these additional retention resources are composed of an engagement dog 52 carried by the skirt 24 of the lever which engages between the wall 32 and the tongue element 21 of the support 4. A rotation of the lever 15, to cause the indexing finger 19 to penetrate into the housing 20, leads to the engagement of the dog 52 below the wall 32. In this position of the lever, illustrated in FIG. 8 for example, the lever 15 is blocked in the direction of axial withdrawal by the wall 32 acting as an axial end-stop to the engagement dog 52.

In addition, this anti-extraction system 50 secondly includes an end-stop surface 55, presented by the lever, designed to come into contact with an obstacle 60 mounted on the support when the lever is positioned between its locked and unlocked positions, for the purpose of preventing the lever from taking up its position of engagement. It should be considered that during the fitting of the lever 15 on the support 4, the obstacle 60 is not present on the support 4. In fact, if the obstacle 60 ware to be present during the fitting of the lever, the latter could not be mounted on the support, due to the presence, firstly, of the end-stop surface 55 and, secondly of the engagement dog 52 coming up against the wall 32. After a rotation of the lever 15 leading, firstly, to the engagement of the dog 52 below the wall and, secondly, to the movement of the end-stop surface 55 freeing up the mounting of the obstacle 60, the latter can be installed on the support 4. When the lever 15 is turned in the opposite direction, its rotation is limited by the end-stop surface 55 coming into contact with the obstacle 60. In this stopped position, the dog 52 is still engaged below the wall 32 of the support, thus preventing the withdrawal of the lever. Advantageously, the end-stop surface 55 can be created from an edge of the anti-removal arm 39. Preferably, the obstacle 60 is formed by the link connector to the sensitive cells.

The invention is not limited to the examples described and illustrated since various modifications can be made to it without moving outside of its scope.

The invention claimed is:

1. A device employed to mechanically fix in position a magnetic linear position sensor (2) comprising:
   a magnetic linear position sensor (2) that includes a support (4) equipped with detection cells that are sensitive to magnetic induction, and a target slide (5) fitted with magnetic elements and mounted to slide on the support in relation to the detection cells,
   locking resources (12) to achieve mechanical locking between the target slide and the support, in order to place the target slide in a reference position in relation to the support, wherein the locking resources correspond to correct fitting of the target slide in relation to the detection cells, the locking resources (12) being operated only if the target slide (5) is placed in a correct fitting direction, and
   resources (13) for controlling the locking resources so that the latter can pass from a locked position to an unlocked position of the target slide in relation to the support, and vice versa.

2. A device according to claim 1, characterized in that the control resources (13) include a lever (15) mounted to rotate about an axle (16) carried by the support, and designed to act upon the locking resources (12), so that, for two angular positions of the lever, respectively referred to as locking and unlocking, the locking resources (12) occupy their locked and unlocked positions respectively.

3. A device according to claim 1, characterized in that the locking resources (12) include an indexing finger (19), controlled so that, in the locked position, it fits into a slot (20) created in the target slide (5), and to be removed from the said slot in the unlocked position.

4. A device according to claim 2, characterized in that the indexing finger (19) is carried by a tongue element (21) extending from the support (4) and on which rotating lever acts (15).

5. A device according to claim 4, characterized in that the rotating lever (15) acts upon the tongue element (21) by means of a ramp (23) carried by the lever, so that the indexing finger is able to pass from the locked position to the unlocked position and vice versa.

6. A device according to claim 2, characterized in that the lever (15) includes a lock indicator arm (35) which, in the locked position of the lever (15), extends as a projection in relation to the support (4) in order to prevent the closure of a housing C for accommodation of the sensor (1) and which, in the unlocked position of the lever, is retracted in relation to this projected position, so as to enable the closure of the said housing.

7. A device according to claim 2, characterized in that it includes resources (30) that prevent the rotation of the lever, in order to pass from the unlocked position to the locked position, whenever the target slide (5) is not occupying its reference position as determined by the locking resources.

8. A device according to claim 7, characterized in that the resources (30) blocking the rotation include an end-stop (31) carried by the lever, and encountered by the indexing finger so that, in the unlocked position, the end-stop comes into contact with a wall (32) of the support that prevent the rotation of the lever, and that in the locked position, an axial movement of the lever (15) causes the end-stop (31) to no longer encounter the wall of the support, thus allowing the rotation of the lever.

9. A device according to claim 2, characterized in that the lever (15) includes an anti-removal arm (39) which, in the unlocked position, extends to coincide with securing devices (40) for the support in the sensor housing C, for the purpose of preventing the removal of the sensor and which, in the locked position, lies outside of the devices for securing the support, so as to enable fixing of the sensor in the sensor housing.

10. A device according to claim 2, characterized in that the lever (15) is mounted on the support (4) by means of an anti-extraction system (50), thus allowing the axial engagement of the lever on its axle in one engagement position which is located outside the angular range determined by the locked and unlocked positions, where this anti-extraction system (50) firstly includes additional retention resources (52) (32) fitted to the lever and the support, and fitting together at least between the locked and unlocked positions so as to prevent the axial withdrawal of the lever, and secondly an end-stop surface (55) presented by the lever, designed to come into contact with an obstacle (60) mounted on the support, when the lever is located between its locked and unlocked positions, for the purpose of preventing the said lever from occupying its engagement position.

11. A device according to claim 10, characterized in that the obstacle (60) mounted on the support is a connector.

12. A magnetic linear position sensor, characterized in that it includes a device (1) according to claim 1, designed to mechanically fix a target slide (5) in position in relation to a support (4) equipped with detection cells.

13. A magnetic linear position sensor according to claim 12, characterized in that the target slide (5) is connected to the control rod (3) of a gearbox in a motor vehicle.

14. A device according to claim 2, characterized in that the locking resources (12) include an indexing finger (19), controlled so that, in the locked position, it fits into a slot (20) created in the target slide (5), and to be removed from the said slot in the unlocked position.

15. A device according to claim 3, characterized in that the indexing finger (19) is carried by a tongue element (21) extending from the support (4) and on which rotating lever acts (15).

16. A device according to claim 6, characterized in that it includes resources (30) that prevent the rotation of the lever, in order to pass from the unlocked position to the locked position, whenever the target slide (5) is not occupying its reference position as determined by the locking resources.

17. A device according to claim 6, characterized in that the lever (15) includes an anti-removal arm (39) which, in the unlocked position, extends to coincide with securing devices (40) for the support in the sensor housing C, for the purpose of preventing the removal of the sensor and which, in the locked position, lies outside of the devices for securing the support, so as to enable fixing of the sensor in the sensor housing.

* * * * *